United States Patent
Snider

(10) Patent No.: US 9,126,534 B2
(45) Date of Patent: Sep. 8, 2015

(54) AUTOMATED CAMERA WASH FOR VEHICLES

(71) Applicant: FORD GLOBAL TECHNOLOGIES, LLC, Dearborn, MI (US)

(72) Inventor: Shane Snider, Highland, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 265 days.

(21) Appl. No.: 13/803,748

(22) Filed: Mar. 14, 2013

(65) Prior Publication Data

US 2014/0270379 A1 Sep. 18, 2014

(51) Int. Cl.
| | | |
|---|---|---|
| G06K 9/00 | (2006.01) | |
| B60R 1/00 | (2006.01) | |
| G06T 7/00 | (2006.01) | |
| B60S 1/08 | (2006.01) | |
| B60R 11/04 | (2006.01) | |
| B60R 11/00 | (2006.01) | |
| B60S 1/52 | (2006.01) | |

(52) U.S. Cl.
CPC . B60R 1/00 (2013.01); B60R 11/04 (2013.01); B60S 1/0848 (2013.01); G06T 7/0002 (2013.01); G06T 7/0008 (2013.01); *B60R 2011/004* (2013.01); *B60S 1/52* (2013.01); *G06T 2207/10016* (2013.01); *G06T 2207/30252* (2013.01)

(58) Field of Classification Search
CPC ..... G06T 7/20; H04N 5/2171; G06K 9/00791
USPC .......................................... 382/104; 348/148
See application file for complete search history.

(56) References Cited

U.S. PATENT DOCUMENTS

| | | | | |
|---|---|---|---|---|
| 3,609,450 | A  * | 9/1971 | Hart | 315/82 |
| 5,850,254 | A  * | 12/1998 | Takano et al. | 348/148 |
| 6,607,606 | B2 * | 8/2003 | Bronson | 134/6 |
| 8,031,224 | B2 | 10/2011 | Linsenmaier et al. | |
| 8,786,697 | B2 * | 7/2014 | Kawasaki | 348/135 |
| 2003/0001509 | A1* | 1/2003 | Leleve | 315/77 |
| 2008/0088702 | A1* | 4/2008 | Linsenmaier et al. | 348/119 |
| 2008/0119993 | A1* | 5/2008 | Breed | 701/46 |
| 2009/0102922 | A1* | 4/2009 | Ito et al. | 348/148 |
| 2011/0073142 | A1* | 3/2011 | Hattori et al. | 134/56 R |
| 2012/0002050 | A1* | 1/2012 | Taniguchi et al. | 348/148 |
| 2012/0117745 | A1* | 5/2012 | Hattori et al. | 15/250.01 |
| 2013/0006523 | A1* | 1/2013 | Sato | 701/428 |
| 2014/0060582 | A1* | 3/2014 | Hartranft et al. | 134/18 |

* cited by examiner

*Primary Examiner* — Stephen R Koziol
*Assistant Examiner* — Shaghayegh Azima
(74) *Attorney, Agent, or Firm* — Raymond L. Coppiellie; Brooks Kushman P.C.

(57) ABSTRACT

A system to remove debris from a vehicle camera lens using washer fluid from the vehicle's washer system is disclosed. The system analyzes a captured image and determines if the image is obstructed by debris. If the image is determined to be obstructed, the system automatically sprays the camera lens with fluid to remove the debris. The system includes a method of determining obstruction by comparing an image with a reference image. The system includes a method of determining obstruction by analyzing relative movement within a reference area of the image. The system also prevents the draining of the washer fluid due to a false obstruction reading or debris that does not come off after a few sprayings.

18 Claims, 5 Drawing Sheets

US 9,126,534 B2

AUTOMATED CAMERA WASH FOR VEHICLES

TECHNICAL FIELD

This disclosure relates to a wash system for a vehicle camera lens, and more specifically to an automated system for spraying washer fluid on the camera lens.

BACKGROUND

Rearward-facing vision systems have been used on vehicles to provide an image of an environment behind the vehicle when the vehicle is in reverse. This rear-view image may be displayed on a monitor within the vehicle cabin. The displayed image may be used to aid a driver in seeing objects behind the vehicle while backing up. Camera lenses are typically located on the exterior of the vehicle and are susceptible to becoming dirty resulting in the image being obstructed or less clear than may be desired.

A forward-facing vision system could provide an image of an environment in front of a vehicle. A forward-view image may be displayed on a monitor within the vehicle cabin much like the rear-view image. The displayed image could then be used to aid a driver in seeing objects in front of the vehicle while driving forward. A forward-facing camera may also be susceptible to becoming dirty resulting in the image being obstructed like that of a rearward-facing camera.

SUMMARY

In one aspect of this disclosure, an automatic spraying system for a vehicular camera is disclosed. The automatic spraying system has a camera disposed on a vehicle that captures a real-time image and sends the image to a controller. The controller receives the image and determines if the real-time image is obstructed. If the real-time image is determined to be obstructed, the controller actuates a pump to spray the camera. The pump then delivers washer fluid from a washer system to a camera lens of the camera in an attempt to remove the obstruction.

According to another aspect of this disclosure, a method for operating a processing unit to automatically spray a vehicle camera lens with washer fluid is disclosed. The processing unit receives a camera image. The processing unit performs digital analysis on the camera image to determine if the camera image is obstructed or compromised. The processing unit sends a signal to spray the vehicle camera lens if the camera image is determined to be obstructed or compromised.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
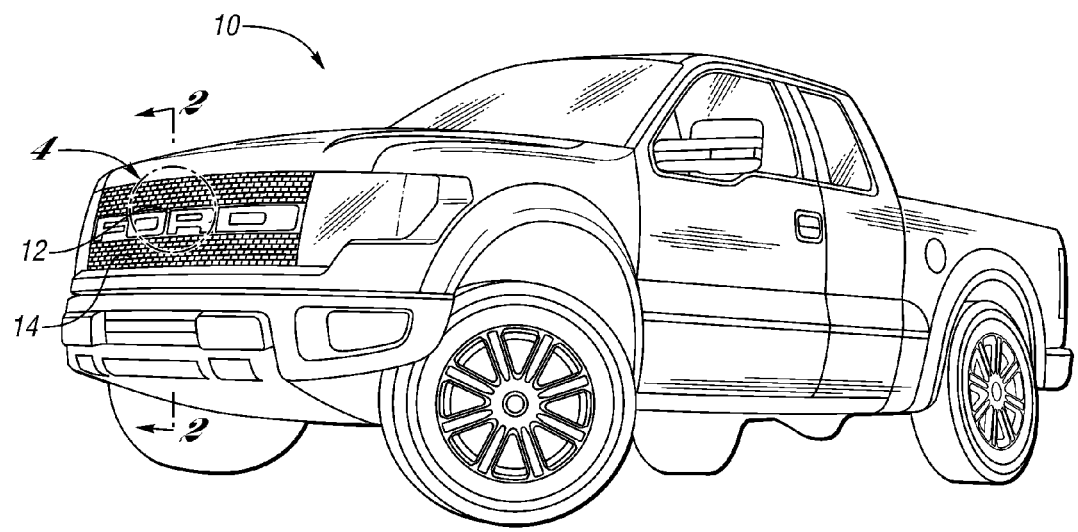
FIG. 1 is a perspective view of a vehicle with a forward-facing camera located on a grill of the vehicle.

FIG. 1 shows a vehicle 10 with a camera 12 located on a grill 14 of the vehicle 10. In this example, the camera 12 points forward and is capable of capturing an image 18 (see FIGS. 5 and 6) of an environment in front of the vehicle 10. The image 18 may be displayed on a video screen 20 within the vehicle cabin (see FIG. 3) and aid a driver in seeing objects located in the path of the vehicle. The image 18 generated by the camera 12 may be a real-time image or a still image.

A forward-view image displayed within a vehicle cabin may be advantageous for vehicles with a high hood-line or other geometry that may block the driver's view of the environment directly in front of the vehicle. Such a forward-view may be particularly advantageous for vehicles that are used for recreational off-roading. Having a displayed image of the environment immediately in front of the vehicle that would otherwise be blocked from the driver's view could aid in choosing the most advantageous wheel path when traversing undulating terrain. Forward-view cameras may also be used for obstacle detection and lane detections systems. As well, cameras may be deployed around the exterior of a vehicle and used in conjunction with vision systems for autonomous vehicles.

Figure 2:
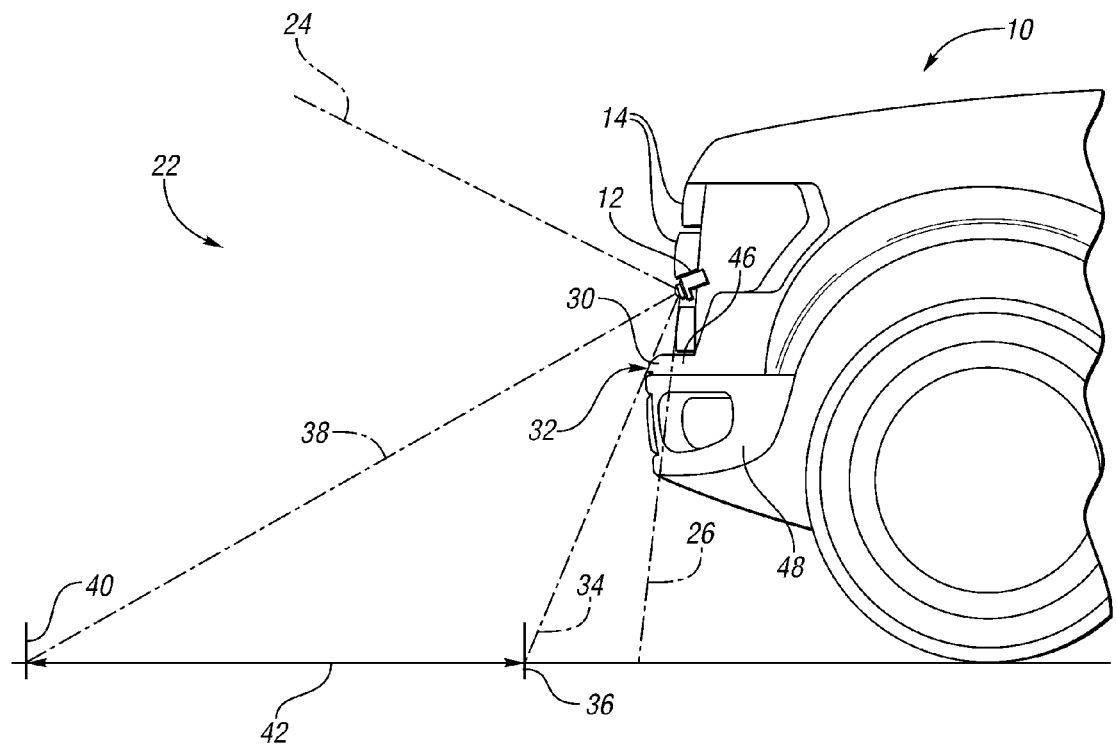
FIG. 2 is a diagrammatic view in which a portion of the figure is taken along line 2-2 of FIG. 1.

FIG. 2 shows the camera 12 mounted to the grill 14 of vehicle 10. The camera may be mounted to any other appropriate structure of the vehicle, such as a front fascia, bumper, hood or roof. The camera 12 has a field of vision 22 bounded by a camera view angle upper limit 24 and a camera view angle lower limit 26. The camera 12 is capable of capturing an image 18 within the camera field of vision 22. In the depicted embodiment, the camera 12 is orientated such that an exterior vehicle component 30 is captured in the field of vision 22. The exterior vehicle component 30 leading edge 32 establishes a ground view proximal limit 34 that ends at a proximal point 36. If the camera is orientated such that an exterior vehicle component 30 is not captured in the field of vision 22, then the camera view angle lower limit 26 will coincide with the ground view proximal limit 34 and end at the proximal point 36. The camera 12 may also be orientated and focused such that a camera view angle center line 38 is directed to a distal point 40 a fixed horizontal distance 42 from the proximal point 36.

The exterior vehicle component 30 is shown as a front fascia component 46 adjacent to and/or covering a portion of a front bumper 48. The camera 12 may also be placed on the vehicle 10 in varying orientations and directions in which the ground view proximal limit 34 may be provided by other exterior vehicle components 30, or portions of exterior vehicle components, such as bumpers, spoilers, fenders, doors, hoods, trunks, hatches or tailgates. Multiple exterior vehicle components 30 may be captured in the field of vision 22 and provide a varying ground view proximal limit 34 across the field of vision 22. The ground view proximal limit 34 may also be provided by a combination of the camera view angle lower limit 26 and ground view proximal limit 34 across the field of vision 22.

Figure 3:
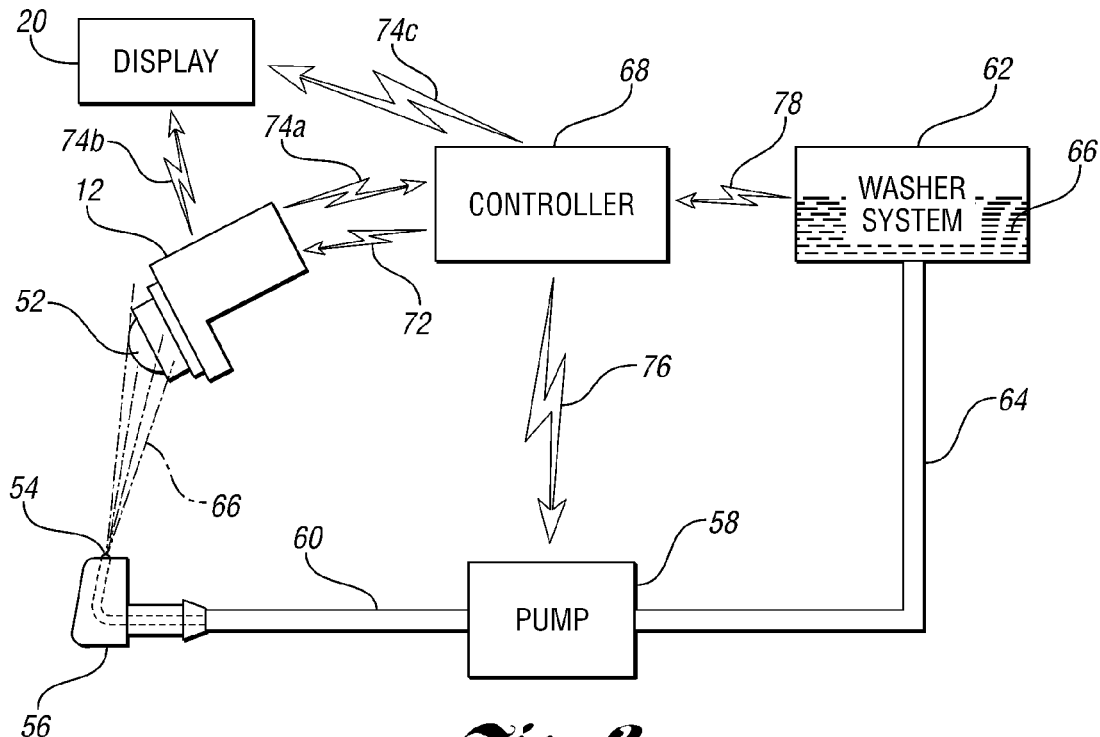
FIG. 3 is a schematic view of the interaction between the components used in an automatic camera wash system.

FIG. 3 shows a camera 12 having a camera lens 52 disposed proximate an outlet 54 of a spray nozzle 56. The spray nozzle 56 is fluidly connected to a pump 58 via a first fluid delivery tube 60. The pump 58 is in turn in fluid communication with a windshield washer system 62 via a second fluid delivery tube 64. The pump 58 may be connected directly to the spray nozzle 56 eliminating the need for the first fluid delivery tube 60. The pump 58 may also be the same pump as used in the windshield washer system 62, or disposed inside of a reservoir in the windshield washer system 62, eliminating the need for the second fluid delivery tube 64. Alternatively, the pump 58 may be connected to a separate and exclusive fluid reservoir (not shown) instead of being incorporated into the vehicle's windshield washer system 62.

The windshield washer system 62 holds washer fluid 66 and the pump 58 is actuated to draw the fluid 66 from the windshield washer system 62 and deliver it to the spray nozzle 56. The spray nozzle 56 in turn is configured to direct the fluid 66 onto the camera lens 52 of the camera 12. The pump 58 and spray nozzle 56 may be configured in combination to deliver a spray of suitable force and coverage to clean the camera lens 52.

The pump 58 may be activated by a driver using a camera wash button, switch, or similar control (not shown) located in the vehicle cabin. The pump 58 may also be activated by a controller 68, or processing unit, operatively associated with the camera 12 and the pump 58. The controller may send an image request signal 72 to the camera 12 and receive an image signal 74a back from the camera 12. The system may also be configured for the camera 12 to transmit a constant image signal 74a feed to the controller 68 without need of the image request signal 72. The controller 68 performs a digital analysis on the camera image to determine if the image is obstructed. If the image is determined to be obstructed, the controller 68 sends a pump activation signal 76 to activate the pump and spray the camera lens 52.

The camera 12 may simultaneously send an image signal 74b to the video screen display 20 located in the vehicle or the controller 68 may send an image signal 74c to the video screen display 20. The image request signal 72 and image signals 74a, 74b, 74c may be sent and received wirelessly using a transceiver, or sent and received through a hard wire connection between the components. The camera 12 may also be designed to broadcast an image signal 74 that may be received by any device tuned into the broadcasted signal.

The automatic spraying system may use fluid 66 from the windshield washer system 62 thus taking away fluid 66 from being used to wash the windshield or other intended purpose. To minimize this concern, the controller may be in communication with the windshield washer system 62 and receive a fluid level signal 78. The controller 68 may be programmed to send a pump activation signal 76 only when the remaining quantity of fluid 66 is above a set level within the windshield washer system 62. As well, the controller 68 and/or pump 58 may be configured to provide an activation of the spray nozzle 56 that is of a controlled duration, such as one second.

To prevent the system from draining a washer fluid supply unnecessarily if an obstruction on the lens cannot be cleared by the spray system, the controller 68 may be configured to deliver a limited/maximum number n of sprays in a single activation sequence then cease spraying. This may be achieved, for example, by configuring the controller 68 to increment a spray count by a count of one when sending the pump activation signal 76. The controller then may accrue the spray counts and only send a pump activation signal 76 if the spray count is less than n+1. If n is set as 2, for example, the automatic spraying system will spray the camera lens 52 only two times during a sequence then stop to avoid wasting more fluid.

Figure 4:
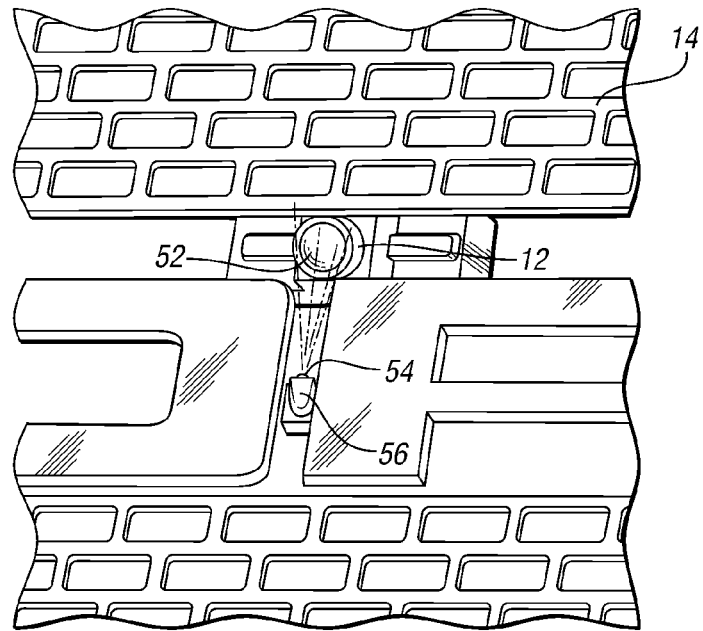
FIG. 4 is a fragmentary view of a vehicle grill with a forward-facing camera.

FIG. 4 shows the spray nozzle 56 disposed on the grill 14 below the camera 12. The outlet 54 of the spray nozzle 56 is directed upwards to spray the camera lens 52. In a forward-view image embodiment of a vehicle with a partially blocking hood-line, the area of the environment most useful to the driver is provided by the camera between the ground view proximal limit 34 and the camera view angle center line 38 (see FIG. 2). The spray nozzle outlet 54 may be pointed at this lower area of the camera lens 52 to focus the spray more in this area and provide a more efficient system. Alternatively, the spray nozzle 56 may be located above and/or to the side of the camera lens 52 from the top or sides, the location chosen to provide better cleaning efficiency for its intended application.

Figure 5:
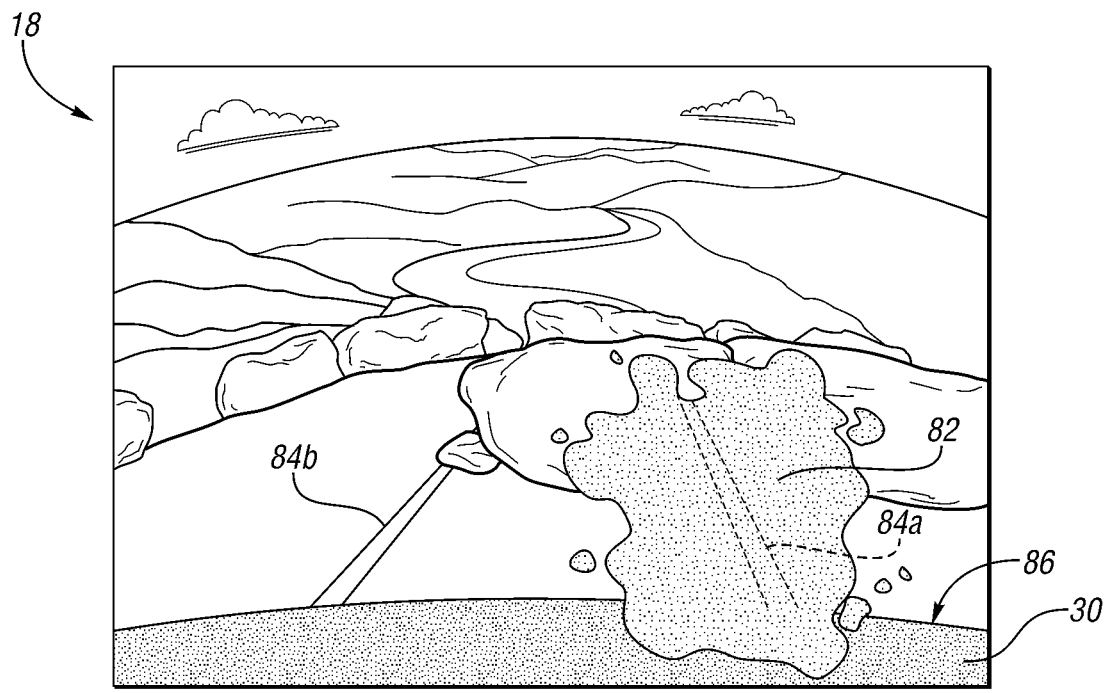
FIG. 5 is a view of an image from a forward-facing camera.

FIG. 5 is an example of an image 18 of an environment in front of the vehicle 10 in which an obstruction 82 blocks a portion of the image 18. The obstruction 82 may be caused by dirt or debris on the camera lens 52 and may block a portion of the view such as that of a right side wheel path 84a. The controller 68 may use a reference image of an exterior vehicle component 30 and compare the image 18 to the reference image for inconsistencies. The exterior vehicle component 30 in the illustration provides a reference line 86 across the image 18. The controller 68 performs an analysis of the image 18 and recognizes a compromise of the reference line 86. The term compromise, as used herein, is intended to encompass any interruption, obscuration, or other interference with the image. If the reference line 86 is determined to be compromised, the controller 68 may send a pump activation signal 76 to spray the camera lens 52 and remove the debris causing the blocked view.

In the illustration, the reference line 86 is provided by a substantially straight leading edge 32 of a front fascia component 46 that spans the entire width of the image 18. However, any combination and shapes of exterior components 46, or portions of exterior components 46, which are within the field-of-view of the camera 12, may be used. The exterior components 46 are a fixed constant within the field-of-view of the camera 12 and may be used to establish a constant profile in every analyzed image 18. Compromised profiles may give an indication of an obstruction 82 on the camera lens 52. The camera 12 may be positioned on the vehicle 10 to provide an exterior view of the vehicle and to capture exterior vehicle components 30 to establish fixed profiles for analysis of the image 18. The controller 68 may in turn perform an analysis of the image 18 and activate the pump if portions of the image 18 are compromised in comparison with the fixed constants of the reference image.

Figure 6:
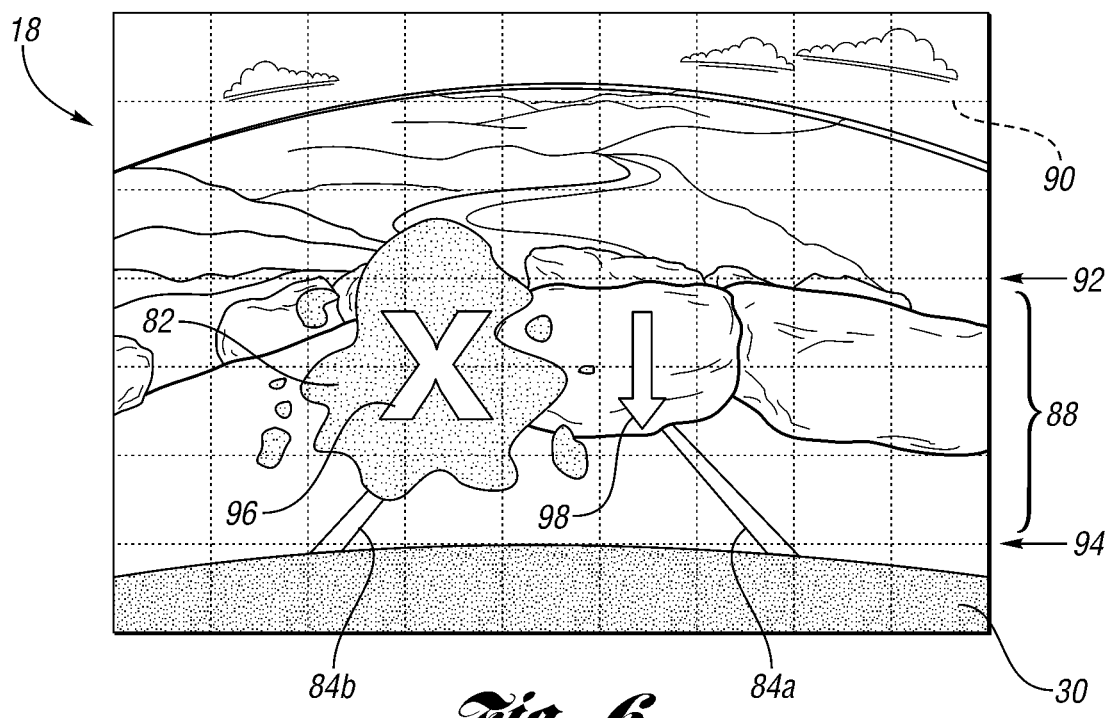
FIG. 6 is another view from a forward-facing camera.

FIG. 6 is an example of a real-time image 18 of an environment in front of the vehicle 10 in which an obstruction 82 blocks a portion of the real-time image 18. In this example, the obstruction 82 blocks the view of a portion of the left wheel path 84b. The controller 68 may perform an analysis of the relative motion of the real-time image 18. Since exterior vehicle components 30, distant objects and the sky display little or no relative movement in the real-time image 18, the controller may perform an analysis on a reference area 88 of the real-time image 18. The real-time image 18 may be divided up into a grid of pixels as represented by dashed lines 90. The dashed lines 90 are shown as equal spaced squares but the curvature of the camera lens 52 may provide for curved pixels of differing sizes around the real-time image 18. The reference area of the real-time image 18 to be analyzed may be bound in a vertical direction by an upper boundary 92 and a lower boundary 94 to provide a reference area expected to exhibit the greatest relative movement. The upper boundary 92 may also be set at the camera view angle center line 38 (see FIG. 2). The lower boundary 94 may also be defined by an exterior vehicle component 30.

When the vehicle 10 is moving, pixels 90 in the reference area 88 will show relative motion from one adjacent pixel to the next (downward for forward vehicle motion, as represented by arrow 98). However, the pixels 90 in the reference area 88 in which the obstruction 82 appears will not show relative motion from one adjacent pixel to the next (represented by 'X' 96). The controller 68 may activate the pump 58 to spray the camera lens 52 if a certain percentage of the reference area 88 does not exhibit relative motion. The threshold percentage of the reference area 88 to initiate the spray may be optimized for the vehicle and may be set at or around 10%. The controller 68 may communicate with a vehicle bus (not shown) to obtain a vehicle speed to increase accuracy of the relative motion analysis. If the vehicle is not moving, or moving at a very slow rate, the relative motion from one adjacent pixel to the next will be reduced, which could lead to a false indication of an obstruction and thus the pump activation signal may not be warranted.

Figure 7:
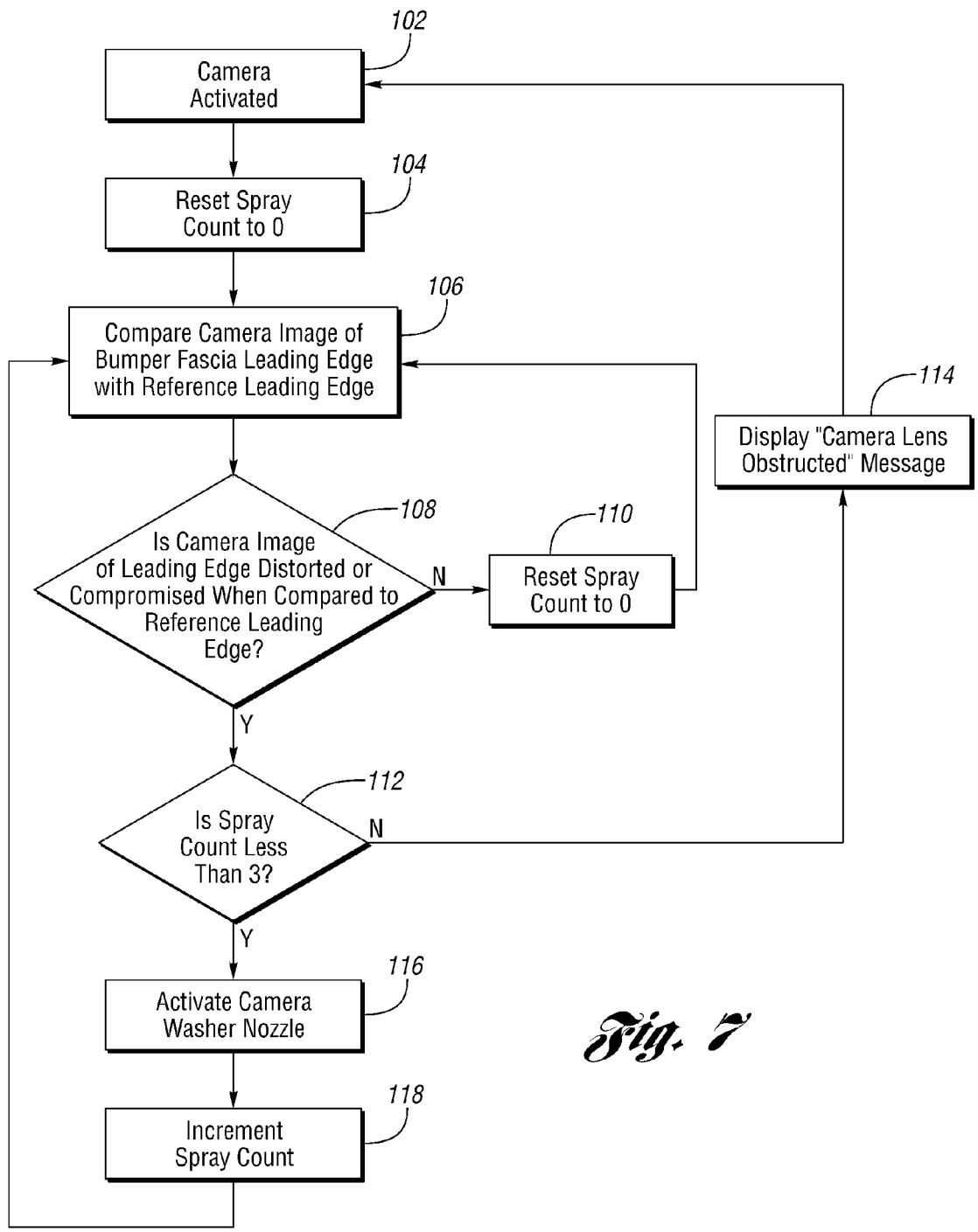
FIG. 7 is a logic flow-chart for a processing unit to automatically wash a camera lens.

FIG. 7 is a method for operating a processing unit to automatically spray a vehicle camera lens with a fluid. The camera is activated at step 102 to start the logic sequence. The camera may be activated by a driver activating a control within the vehicle cabin. Camera activation resets a spray count to zero as shown at step 104. An event indicating a start of a drive cycle (such as ignition key-on) may also be used to reset the spray count to zero. At step 106 the image from the camera is compared to a reference image to determine whether an obstruction is present. At step 108, if the image comparison indicates no obstruction, then the image is deemed clear of obstruction and the processing unit may return to step 106. In one embodiment, step 110 may be used to reset the spray count to zero when the camera image is determined to not be obstructed.

At step 108, if the image is determined to be compromised, then the image may be obstructed and the processor moves to step 112. Step 112 checks the spray count, and if the spray count is already at two, then the processing unit sends a signal to indicate that the camera lens is obstructed, as indicated at step 114. Step 112 prevents the processing unit from continuing to spray a camera lens that has a false obstructed reading or debris that cannot be removed by a spray of fluid. At step 112, if the spray count is less than three, then the logic sequence moves on to step 116. At step 116, the processing unit sends a signal to the pump to spray the camera lens, as indicated at step 116. At step 118 the processing unit increments a spray count and then returns to step 106 to continue the analysis.

Figure 8:
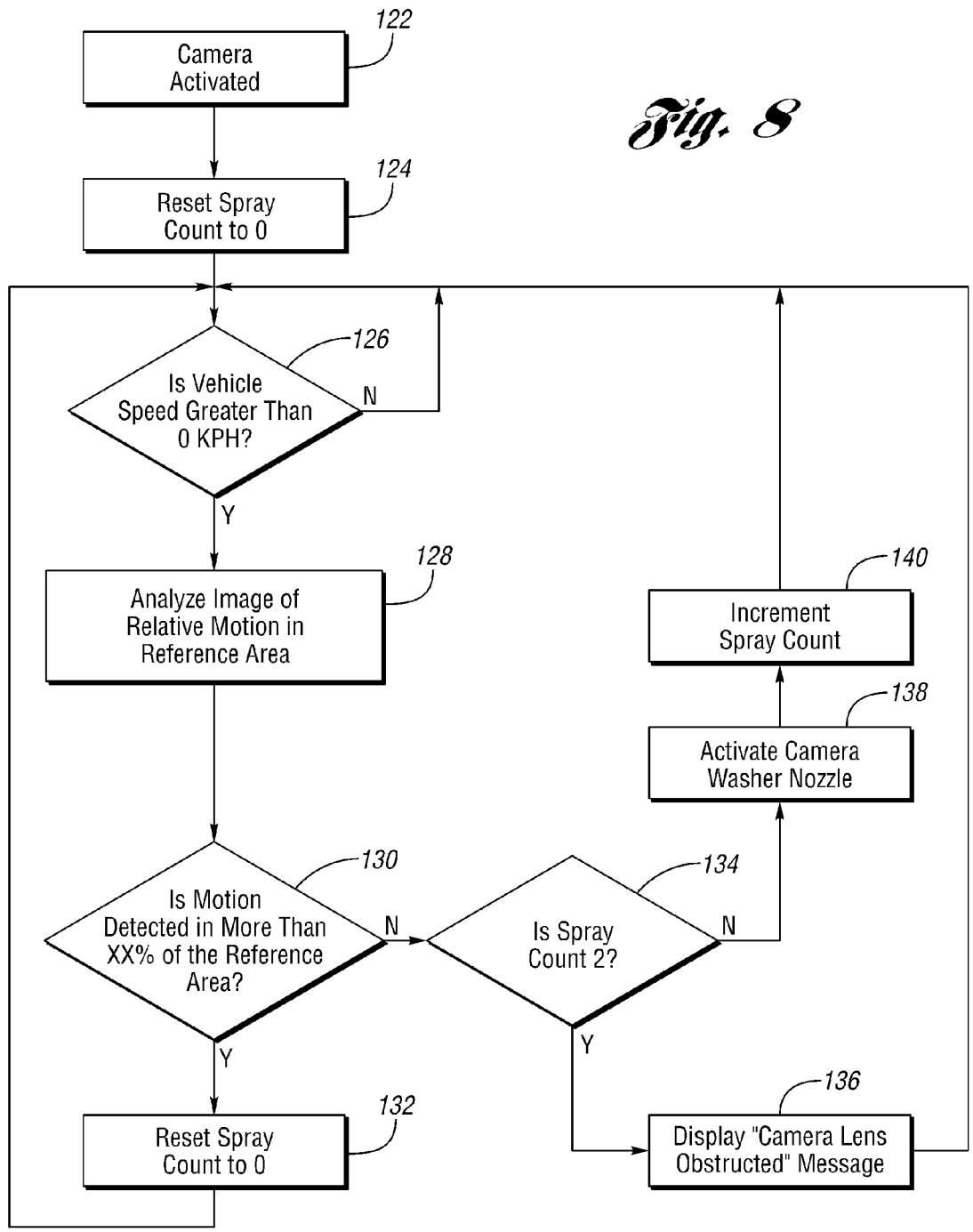
FIG. 8 is another logic flow-chart for a processing unit to automatically wash a camera lens.

FIG. 8 is another method for operating a processing unit to automatically spray a vehicle camera lens with a fluid. The camera is activated at step 122 to start the logic sequence. Step 124 resets the spray count to zero. Step 126 holds the logic sequence until the vehicle begins to move. If there is an obstruction of the image noticed while the vehicle has yet to begin moving, the driver may manually activate the system to spray the camera lens. Once the vehicle begins to move the logic sequence moves to step 128 and the processing unit analyzes the reference area for relative movement. At step 130, if relative movement is detected in the reference area greater than a threshold percentage of the reference area, then the camera lens 52 is deemed to be clear. At step 132, the spray count is reset to zero and the logic sequence returned to step 126 to continue the analysis.

At step 130, if no motion is detected within a portion of the reference area greater than a threshold percentage, then the real-time image is deemed to be obstructed. The threshold value may be optimized for each system and use. An effective threshold value may be as high as 90%. At step 134 the spray count is reviewed. If the spray count is 2, then the logic sequence moves to step 136 and a message is displayed to the driver to indicate that the camera lens is obstructed. From block 136, the method loops back to block 126 and the spray nozzle will not be activated further until the counter is reset by an action such as manually cleaning the lens. If the spray count is not 2, then the logic sequence moves on to step 138 in which the processing unit sends a signal to the pump to spray the camera lens. At step 140 the spray count is incremented by one and the logic sequence is returned to step 126 to continue the analysis.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An automatic spraying system for a vehicular camera comprising:
   a camera disposed on a vehicle and producing an image;
   a pump delivering fluid from a washer system to spray the camera; and
   a controller operatively associated with the camera and pump to evaluate relative motion in a reference area of the image and activate the pump if a percentage of the reference area of the image does not exhibit relative motion.

2. An automatic spraying system for a vehicular camera comprising:
   a camera disposed on a vehicle and producing an image of a portion of an exterior vehicle component providing a reference line across at least a portion of the image;
   a pump delivering fluid from a washer system to spray the camera; and
   a controller operatively associated with the camera and pump to activate the pump if the controller determines that the reference line is compromised.

3. The system of claim 1 wherein the camera is disposed on a grill such that a portion of a front fascia covering a bumper is captured in the image.

4. The system of claim 1 wherein the reference area of the image is defined in a vertical direction by an upper boundary and a lower boundary.

5. The system of claim 1 wherein the controller obtains a vehicle speed from a vehicle bus and determines the relative motion in the image in reference to the vehicle speed.

6. The system of claim 1 wherein the controller increments a camera spray count when the controller actuates the pump to spray the camera.

7. The system of claim 6 wherein the controller actuates the pump to spray the camera when the camera spray count is less than 3.

8. The system of claim 6 wherein the camera spray count is returned to zero at key-on of the vehicle.

9. The system of claim 6 wherein the camera spray count is returned to zero when a request to display the image within the vehicle is initiated.

10. A method for operating a processing unit to automatically spray a vehicle camera lens with a fluid comprising:
 receiving a camera image;
 performing digital analysis to compare relative motion in a reference area of the image with vehicle speed; and
 if a percentage of the reference area of the image does not show relative motion in relation to the vehicle speed, sending a signal to spray the vehicle camera.

11. The method of claim 10 further comprising incrementing a spray count by one when sending the signal to spray the vehicle camera lens.

12. The method of claim 11 wherein the step of performing digital analysis is performed when the spray count is less than three.

13. The method of claim 11 further comprising resetting the spray count to zero if the camera image is not determined to be obstructed.

14. The system of claim 2 wherein the exterior vehicle component comprises at least one of a bumper, a front fascia component, a spoiler, a grill, a fender and a hood.

15. The system of claim 2 wherein the controller increments a camera spray count when the controller actuates the pump to spray the camera.

16. The system of claim 15 wherein the controller actuates the pump to spray the camera when the camera spray count is less than 3.

17. The system of claim 15 wherein the camera spray count is returned to zero at key-on of the vehicle.

18. The system of claim 15 wherein the camera spray count is returned to zero when a request to display the image within in the vehicle is initiated.

* * * * *